US012722232B2

(12) United States Patent
Giovanoli et al.

(10) Patent No.: US 12,722,232 B2
(45) Date of Patent: Sep. 1, 2026

(54) LASER PROCESSING MACHINE, IN PARTICULAR LASER CUTTING MACHINE, WITH A SPARK PROTECTION DEVICE

(71) Applicant: Bystronic Laser AG, Niederönz (CH)

(72) Inventors: Lino Giovanoli, Aarwangen (CH); Christian Flückiger, Leimiswil (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/873,343

(22) PCT Filed: Jun. 13, 2023

(86) PCT No.: PCT/EP2023/065764
§ 371 (c)(1),
(2) Date: Dec. 10, 2024

(87) PCT Pub. No.: WO2023/242174
PCT Pub. Date: Dec. 21, 2023

(65) Prior Publication Data
US 2025/0170677 A1 May 29, 2025

(30) Foreign Application Priority Data
Jun. 15, 2022 (EP) .................................... 22179198

(51) Int. Cl.
*B23K 26/38* (2014.01)
*B23K 26/08* (2014.01)
*B23K 26/70* (2014.01)

(52) U.S. Cl.
CPC .............. *B23K 26/38* (2013.01); *B23K 26/08* (2013.01); *B23K 26/70* (2015.10)

(58) Field of Classification Search
CPC ......... B23K 26/38; B23K 26/70; B23K 26/08
(Continued)

(56) References Cited

U.S. PATENT DOCUMENTS 4,778,155 A * 10/1988 Suchevich ............ B23K 10/00 219/121.48
4,781,517 A * 11/1988 Pearce ..................... B25J 18/02 104/167
(Continued)

FOREIGN PATENT DOCUMENTS

CN 110711928 A * 1/2020 ............ B23K 10/00
CN 215316340 U * 12/2021 ............ B23K 26/21
(Continued)

OTHER PUBLICATIONS

English Language Machine Translation of WO2015091184A1.
(Continued)

*Primary Examiner* — Jimmy Chou
(74) *Attorney, Agent, or Firm* — BelayIP

(57) ABSTRACT

A laser processing machine includes a machine frame with two longitudinal beams running in a first direction and having a bridge with a laser processing head running in a second direction transverse to the first direction. The bridge is arranged to be movable in the first direction on the two longitudinal beams. A workpiece plane of the laser processing machine for receiving and processing a workpiece is formed in a processing space between the two longitudinal beams. The workpiece plane extends in the first direction and the second direction in the region of a transition from the bridge to the two longitudinal beams. A spark protection device is arranged in the region of the transition and has a main deflection surface extending in the first direction. The main deflection surface is inclined transversely to the first direction with respect to the workpiece plane in the direction of the processing space.

13 Claims, 3 Drawing Sheets

(58) Field of Classification Search
USPC .................................................... 219/121.67
See application file for complete search history.

(56) References Cited

U.S. PATENT DOCUMENTS 5,049,723 A * 9/1991 Macdonald .......... B23K 26/032 219/121.78
5,373,136 A * 12/1994 Ernst ...................... B23K 26/10 219/121.82
5,481,083 A * 1/1996 Smyth, Jr. .......... B23K 26/0838 219/121.78
5,635,086 A * 6/1997 Warren, Jr. ............ B23K 10/00 219/121.78
5,854,460 A * 12/1998 Graf ...................... B23K 26/38 428/116
6,601,426 B2 * 8/2003 Wegener ................ B23K 26/10 219/121.73
8,198,566 B2 * 6/2012 Baird ..................... B23K 26/40 219/121.68
8,527,084 B2 * 9/2013 Maurer ............. B23K 26/0884 83/72
9,000,321 B2 * 4/2015 Yamaguchi .......... B23K 26/142 219/68
11,745,293 B2 * 9/2023 Bürgi ................. B23K 26/0884 219/121.78
2003/0034336 A1 * 2/2003 Erlenmaier ........ B23K 26/0876 219/121.67
2003/0226835 A1 * 12/2003 Bell ...................... B23K 26/10 219/121.61
2008/0197118 A1 * 8/2008 Gattiglio ................ B23K 26/21 219/121.63
2010/0089880 A1 * 4/2010 Sercel .................. B23K 9/1087 219/121.67
2010/0096370 A1 * 4/2010 Yamazaki .......... B23K 26/1482 219/121.67
2010/0301020 A1 * 12/2010 Phillip ................... B23K 10/00 219/121.44
2011/0210109 A1 * 9/2011 Szelagowski .......... B23K 26/38 219/121.72
2013/0248503 A1 * 9/2013 Lee .................... B23K 37/0235 219/121.72
2014/0312010 A1 * 10/2014 Phillip ..................... B23K 7/00 266/77
2014/0374393 A1 * 12/2014 Battheu ............. B23K 26/0876 219/121.79
2015/0001195 A1 * 1/2015 Okada .................... B23K 26/38 219/121.84
2015/0158124 A1 * 6/2015 Kino ...................... B23K 26/08 219/121.6
2015/0273633 A1 * 10/2015 Masauji ............. B23Q 11/0891 219/121.67
2016/0039048 A1 * 2/2016 Giguère ............. B23K 26/0884 451/75
2016/0059363 A1 * 3/2016 Ardisson .............. B23K 26/032 219/121.67
2016/0256956 A1 * 9/2016 Nagae .................... B23K 26/38
2018/0026425 A1 * 1/2018 Usuda ................... H01S 5/4025 372/32
2019/0247960 A1 * 8/2019 Mienhardt ................ B26F 1/38
2023/0054278 A1 * 2/2023 Sepp ...................... B23K 31/10

FOREIGN PATENT DOCUMENTS

CN 118455777 A * 8/2024 ............. B23K 26/38
CN 118595627 A * 9/2024 ............. B23K 26/38
EP 2130639 A1 12/2009
WO WO-2015091184 A1 * 6/2015 ......... B23K 26/0876

OTHER PUBLICATIONS

English Language Machine Translation of EP2130639A1.
Notification of Transmittal of the International Preliminary Report on Patentability for PCT/EP2023/065764 dated Apr. 20, 2024.

* cited by examiner 121
116
117
115
142
145
132
141
142
W1
130
120
z
WE
112
118
123
124
x
y 121
116
117
115
143
143
145
146
132
146
W2
W1
142
130
120
141
z
WE
112
118
142
123
124
x
y 121
116
117
115
143
145
143
132
146
146
W2
142
141
W1
130
120
147
144
W3
147
z
WE
112
118
144
123
124
142
x
y Fig. 6
121 116 117 115 142 132 142 W1 130 141 120 WE 112 118 123 124 145 z x y
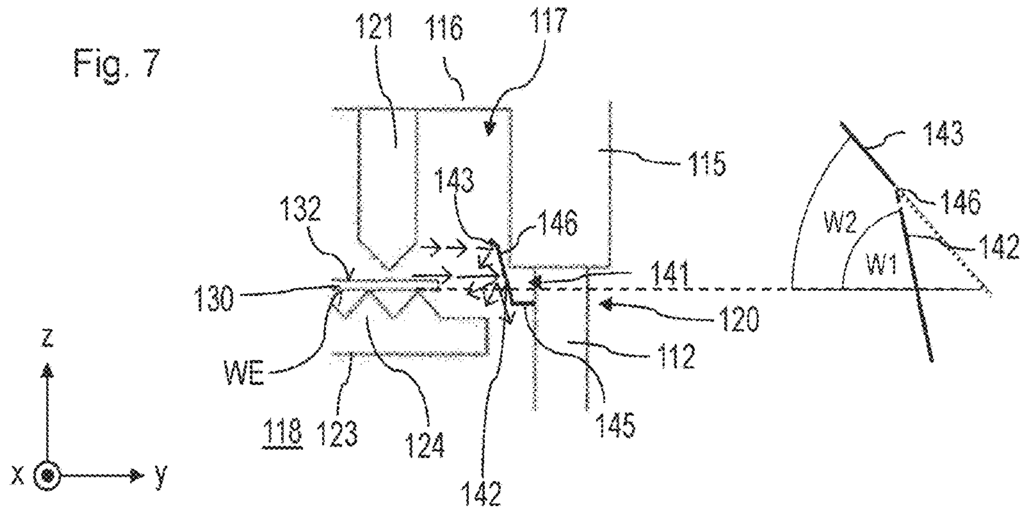
Fig. 7
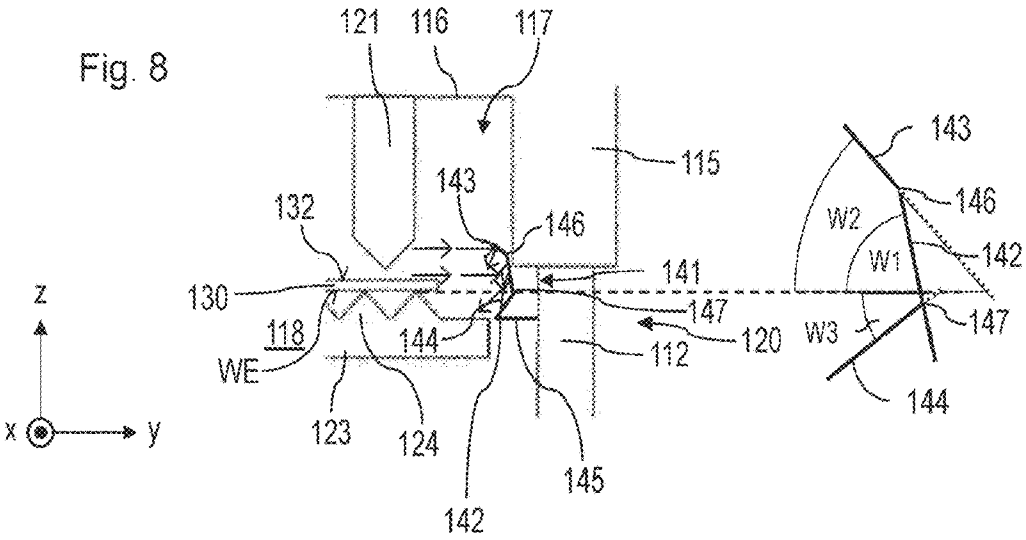
Fig. 8

LASER PROCESSING MACHINE, IN PARTICULAR LASER CUTTING MACHINE, WITH A SPARK PROTECTION DEVICE

CROSS REFERENCE TO RELATED APPLICATIONS

This application is a national stage of international application PCT/EP2023/065764, filed Jun. 13, 2023, which claims priority to European patent application 22179198.1, filed Jun. 15, 2022, the content of both of which is herein incorporated by reference.

BACKGROUND OF THE INVENTION

Field of the Invention

The present invention relates to a laser processing machine, in particular a laser cutting machine, having a machine frame, which has two longitudinal beams running in a first direction, and having a bridge running in a second direction, transverse to the first direction, having a laser processing head, which is arranged to be moveable in the first direction on the two longitudinal beams. A workpiece plane of the laser processing machine for receiving and processing a workpiece is formed in a processing space between the two longitudinal beams. The workpiece plane extends in the first direction and the second direction in the region of a transition from the bridge to the two longitudinal beams.

Description of Related Art

When processing a workpiece using the laser processing head of the laser processing machine, sparks occur in the region of a processing point where a laser hits the workpiece, and these sparks move away from the processing point in the radial direction during the processing process. Dirt particles, which are caused by material removed from the workpiece, are thrown away from the processing point in the radial direction together with the sparks. Due to the kinetic and thermal energy inherent in the sparks and the dirt particles, which can pose a risk to an operator in the vicinity of the laser processing machine and to components inside the laser processing machine, spark protection devices are known from the prior art.

JP 2019-107 653 A2 discloses a spark protection device that is arranged around and moves with the laser processing head to prevent the scattering of spatter at the time of laser processing. Providing a protective hood around the laser processing head is known from CN 212 705 012 U. These spark protection devices, which are known from the prior art, make it possible to protect an operator of the laser processing machine as well as components inside the laser processing machine from sparks while the workpiece is being processed.

It is also known from DE 202020 102 323 U1 to provide a processing machine for the thermal processing of workpieces in a work area with an extraction system. For this purpose, an extraction chamber is provided below the work area, which is connected to an extraction channel. A widening of the extraction channel is provided as a particle chute. This processing machine requires a relatively complex device in order to remove particles produced during a processing operation.

BRIEF SUMMARY OF THE INVENTION

The object of the invention is to provide a laser processing machine, in particular a laser cutting machine, which is able to discharge the sparks and dirt particles produced when processing a workpiece in a structurally simple and controlled manner, into a region that is not critical for the operator and the laser processing machine.

A laser processing machine, in particular a laser cutting machine, having a machine frame and having a bridge with a laser processing head is proposed. The laser processing head is in particular a laser cutting head. The machine frame has two longitudinal beams running in a first direction. The bridge extends in a second direction transverse to the first direction. The bridge is arranged to be movable in the first direction on the two longitudinal beams. A workpiece plane of the laser processing machine for receiving and processing a workpiece is formed in a processing space between the two longitudinal beams. The workpiece plane extends in the first direction and the second direction in the region of a transition from the bridge to the two longitudinal beams.

In the present application, the term "processing space" is to be understood as having the spatial volume in which the workpiece comes to rest. The processing space is thus defined in a direction perpendicular to the workpiece plane by the thickness of the workpiece and represents the spatial volume in which a laser beam emitted by the laser processing head can impinge on the material of the workpiece. Accordingly, the processing space is below the laser processing head in an operating arrangement of the laser processing machine.

The term "workpiece plane" is to be understood as meaning the plane in which the workpiece rests on a support surface of a cutting table of the laser processing machine. A region above the workpiece plane faces the laser processing head. A region below the workpiece plane faces away from the laser processing head.

The first direction and the second direction are orthogonally meeting directions of a Cartesian coordinate system. The first direction represents a longitudinal direction or X-direction of the laser processing machine, the second direction represents a transverse direction or Y-direction of the laser processing machine, and a third direction represents a vertical direction or Z-direction of the laser processing machine.

According to the invention, a spark protection device is arranged in the region of the transition from the bridge to the two longitudinal beams. The spark protection device has a main deflection surface extending in the first direction. The main deflection surface is inclined transversely to the first direction in relation to the workpiece plane in the direction of the processing space at a first angle of inclination of less than 90° for deflecting sparks into the processing space in a direction away from the laser processing head.

The spark protection device thus enables the discharge of sparks and dirt particles in a region below the workpiece plane. The term "below the workpiece plane" refers to an operating arrangement of the laser processing machine in space, so that the dirt particles are directed in the direction of gravity to the side facing away from the laser processing head and thus into the region below the underside of the workpiece.

The spark protection device proposed according to the invention makes it possible to deflect material removed from the workpiece (herein also referred to as "dirt" or "dirt particles") into the region below the machined workpiece. As a result, a region above the workpiece and above the workpiece plane can be kept clean and largely free of dirt particles. The spark protection device thus represents component protection, which in particular keeps the transition region from the bridge to the two longitudinal beams free of dirt particles. At the same time, dirt particles are kept away from such environmental regions in which an operator of the laser processing machine is located.

The embodiment of the spark protection device according to the invention is based on the observation that fine dust is whirled up when the workpiece is cut with the laser processing head, wherein the resulting particles are distributed essentially horizontally, i.e. parallel to an XY plane, and radially away from the processing point. In particular, the dirt particles are blown out in a direction opposite to the movement of the laser processing head during the processing operation (cutting) of the workpiece. The spark protection device formed according to the invention not only prevents dirt particles from penetrating into machine parts in the transition region from the bridge to the two longitudinal beams, but also into a spatial volume above the workpiece plane.

According to an expedient embodiment, the main deflection surface extends in a third direction, which extends perpendicularly to the first and second directions, beyond the plane of the workpiece. The third direction corresponds to the above-mentioned Z-direction (vertical direction) of the laser processing machine. The main deflection surface can extend in the third direction beyond the workpiece plane in the direction of the laser processing head. Alternatively, the main deflection surface can extend in the third direction beyond the workpiece plane in the direction away from the laser processing head. As a further alternative, the main deflection surface can extend in the third direction both in the direction of the laser processing head and away from the laser processing head beyond the workpiece plane.

It has proven to be expedient if the first angle of inclination for deflecting sparks into the processing space in the direction away from the laser processing head is between 70° and 88°, preferably between 75° and 87°.

According to a further expedient embodiment, a first edge of the main deflection surface running in the first direction is followed by a first additional deflection surface, which extends in the direction of the laser processing head at a second angle of inclination, which is smaller than the first angle of inclination, in the direction of the workpiece plane. The first edge is expediently formed between the main deflection surface and the first additional deflection surface above the workpiece plane, in the direction of the laser processing head. The first additional deflection surface enables further improved component and operator protection against dirt particles that are caused by processing the workpiece.

A further expedient embodiment provides that a second edge of the main deflection surface extending in the first direction is adjoined by a second additional deflection surface that extends with respect to the workpiece plane with a third angle of inclination in a direction facing away from the laser processing head. The second edge is expediently formed between the main deflection surface and the second additional deflection surface below the workpiece plane. Dirt particles thrown in the direction of the spark protection device can be deflected into the region below the workpiece plane via the second additional deflection surface, similar to a "chute" or "slide". As a result, further improved protection of the components of the laser processing machine can be achieved.

According to a further expedient embodiment, the spark protection device is fastened to the longitudinal beam in a first alternative. In other words, the spark protection device is arranged in a stationary manner on the laser processing machine. The spark protection device preferably extends in the first direction over the entire length of the processing space along the longitudinal beam. This ensures complete component protection.

Furthermore, it is expedient if the spark protection device has one or more recesses, at least in sections, in the region of a transition surface that extends essentially parallel to the plane of the workpiece and with which the spark protection device is fastened to the longitudinal beam. In the event that dirt particles get into a gap between the spark protection device and the longitudinal beam, the dirt particles can fall through the one or more recesses into the region below the workpiece plane. An accumulation of dirt particles in the gap between the spark protection device and the longitudinal beam can be avoided. Cleaning intervals can be omitted or reduced as a result.

In a second alternative, the spark protection device can be fastened to the bridge and move with the bridge along the longitudinal beams of the machine frame. As a result, the spark protection device can be constructed more compactly, i.e. with a reduced length in the first direction compared to the first variant. The fact that no spark protection device or other components are mounted on the longitudinal beams of the machine frame also makes access to the processing region easier for a user.

A further expedient embodiment provides that the spark protection device consists of a material with good thermal conductivity. In particular, aluminium or steel or alloys thereof come into consideration as heat-conducting materials. Spark protection devices made of any of the above materials can be easily provided at relatively low cost.

The spark protection device can be formed as a one-piece bent part for each longitudinal beam. Alternatively, the spark protection device can be composed of several parts. A first part can form the main deflection surface, for example. The first and/or second additional deflection surface can be formed by a second and/or third part.

BRIEF DESCRIPTION OF THE SEVERAL VIEWS OF THE DRAWINGS

The invention is explained in more detail below on the basis of exemplary embodiments with reference to the accompanying drawings, which likewise disclose features that are essential to the invention. These exemplary embodiments are used for illustration purposes only and are not to be construed as limiting. For example, a description of an exemplary embodiment with a large number of elements or components should not be interpreted to the effect that all of these elements or components are necessary for implementation. Rather, other exemplary embodiments can also contain alternative elements and components, fewer elements or components, or additional elements or components. Elements or components of different exemplary embodiments can be combined with one another, unless otherwise stated. Modifications and variations which are described for one of the exemplary embodiments can also be applied to other exemplary embodiments. To avoid repetition, elements that are the same or that correspond to one another are denoted by the same reference symbols in different figures and are not explained more than once.

The invention is explained in more detail below using exemplary embodiments in the drawing. In the drawings:

FIGS. 6 to 8 show different exemplary embodiments of a spark protection device, each of which is attached to a machine frame of the laser processing machine.

DETAILED DESCRIPTION OF THE INVENTION

Figure 1:
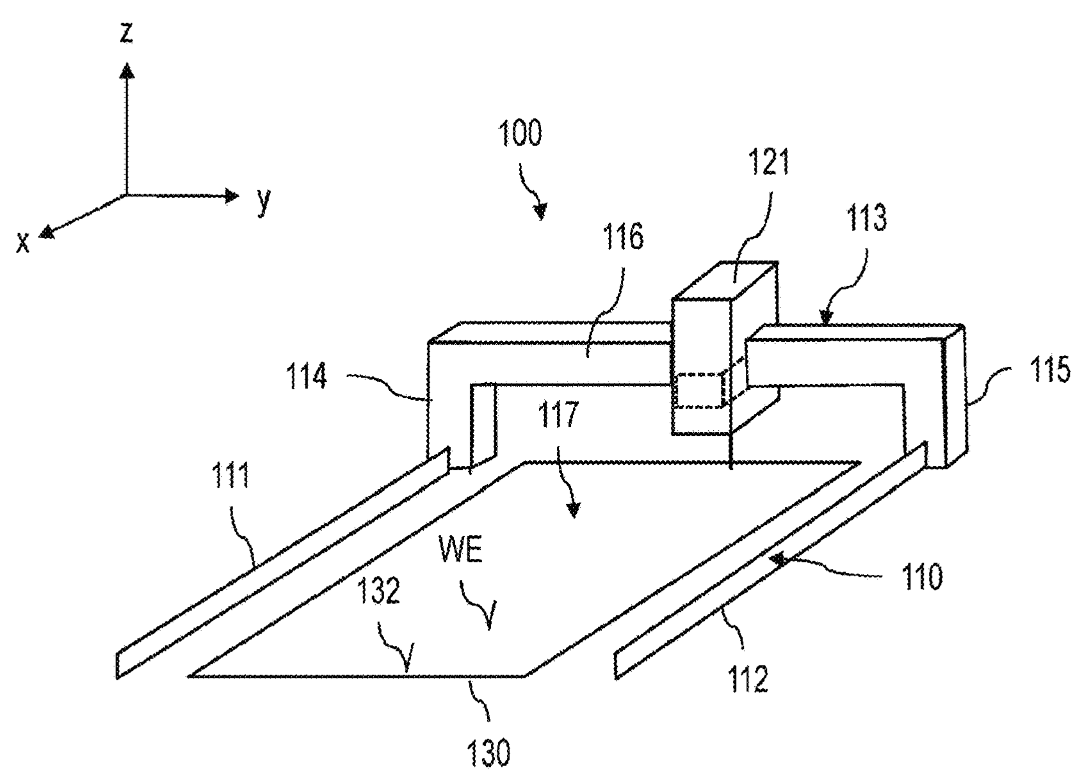
FIG. 1 shows a schematic perspective view of a laser processing machine according to the invention.

FIG. 1 shows a perspective view of a laser processing machine 100 according to the invention in the form of a laser cutting machine. In FIG. 1 and also in the other FIGS. 2 to 8, a spatial coordinate system is shown to describe the directions of the laser processing machine 100. The X-direction or first direction corresponds to a longitudinal direction of the laser processing machine 100. The Y-direction or second direction corresponds to a transverse direction of the laser processing machine 100. The Z-direction or third direction corresponds to a vertical direction of the laser processing machine 100. The X-, Y- and Z-directions are orthogonal to one another.

The laser processing machine 100 has a machine frame 110 that has two longitudinal beams 111, 112 running in the longitudinal direction (X). The cross beams or components of the machine frame 110 connecting the longitudinal beams 111, 112 are not shown for the sake of clarity. A bridge 113 runs transversely to the longitudinal direction (X) in the transverse direction (Y). The bridge 113 consists of a traverse 116 that extends in the transverse direction (Y), wherein two bridge feet 114, 115 running in the vertical direction (Z) are arranged at its opposite ends. A laser processing head 121, in particular a laser cutting head, is arranged on the traverse 116 of the bridge 113.

The bridge feet 114, 115 extend downwards from the ends of the traverse 116 in the direction of their associated longitudinal beams 111, 112. The bridge feet 114, 115 are connected to the longitudinal beams 111, 112 with corresponding guide components (not shown) in such a way that a movement in the longitudinal direction (X) is made possible by means of an actuator (not shown). As a result, the bridge 113 with the laser processing head 121 is arranged to be moveable in the longitudinal direction (X) on the two longitudinal beams 111, 112. The laser processing head 121 can be moved in the transverse direction and in the vertical direction (Z) along the traverse 116 by an actuator system (not shown).

A processing space 117 with a cutting table 123 (see FIG. 2) is formed between the two longitudinal beams 111, 112. The cutting table 123 has a cutting grid 124 on which a workpiece 130 to be machined rests with its lower workpiece surface, as a result of which an upper workpiece surface 132 faces the laser processing head. A workpiece plane WE of the laser processing machine 100 is thus defined in the processing space 117. The workpiece plane WE represents the plane in the laser processing machine 100 or in space, in which the workpiece 130 rests on the cutting grid 124 of the cutting table 123 (see FIG. 2). In the direction of gravity below the cutting table 123, a spatial volume is formed, which is referred to below as the collection space 118.

The processing space 117 is formed by the spatial volume of the workpiece 130 resting on the cutting grid 124 of the cutting table 123. In the case of a thin workpiece 130, the processing space 117 can approximately coincide with the workpiece plane WE. If the workpiece 130 is thick (e.g. several centimetres), the processing space 117 extends from the workpiece plane WE according to the thickness of the workpiece 130 in the direction of the laser processing head 121, as shown, for example, in the side view of the laser processing machine 100 from the front in FIG. 2.

The workpiece plane WE and the processing space 117 extend in the longitudinal and transverse direction (X, Y) approximately in the region of a transition 119, 120 from the bridge 113 to the two longitudinal beams 111, 112. This can best be seen in FIG. 2. In the region of the transition 119, 120, guide elements and/or drive elements (not shown in detail) are arranged, by means of which the bridge feet 114, 115 can be moved in the longitudinal direction (X) along the longitudinal beams 111, 112. In this region of the transition 119, 120, in addition to the mechanical components required for this purpose, corresponding electrical devices can also be arranged.

To protect the components arranged in the region of the transition 119, 120, respective spark protection devices 140, 141 are arranged in the region of the transition, which have a main deflection surface 142 extending in the longitudinal direction. In the following description, only the spark protection device 141 assigned to the transition 120 is referred to. The following explanations apply correspondingly to the spark protection device 140 assigned to the transition 119.

The main deflection surface 142 of the spark protection device 141 is inclined transversely to the longitudinal direction (X) with respect to the workpiece plane WE in the direction of the processing space 117 at an angle of less than 90°, in order to cause a deflection of sparks and dirt particles into the collection space 118, i.e. a direction facing away from the laser processing head 121 or the processing space 117. The angle of the main deflection surface 142 relative to the workpiece plane is also referred to below as the first angle of inclination W 1. The first angle of inclination W1 is expediently between 70° and 88°, and preferably between 75° and 87°.

Figure 2:
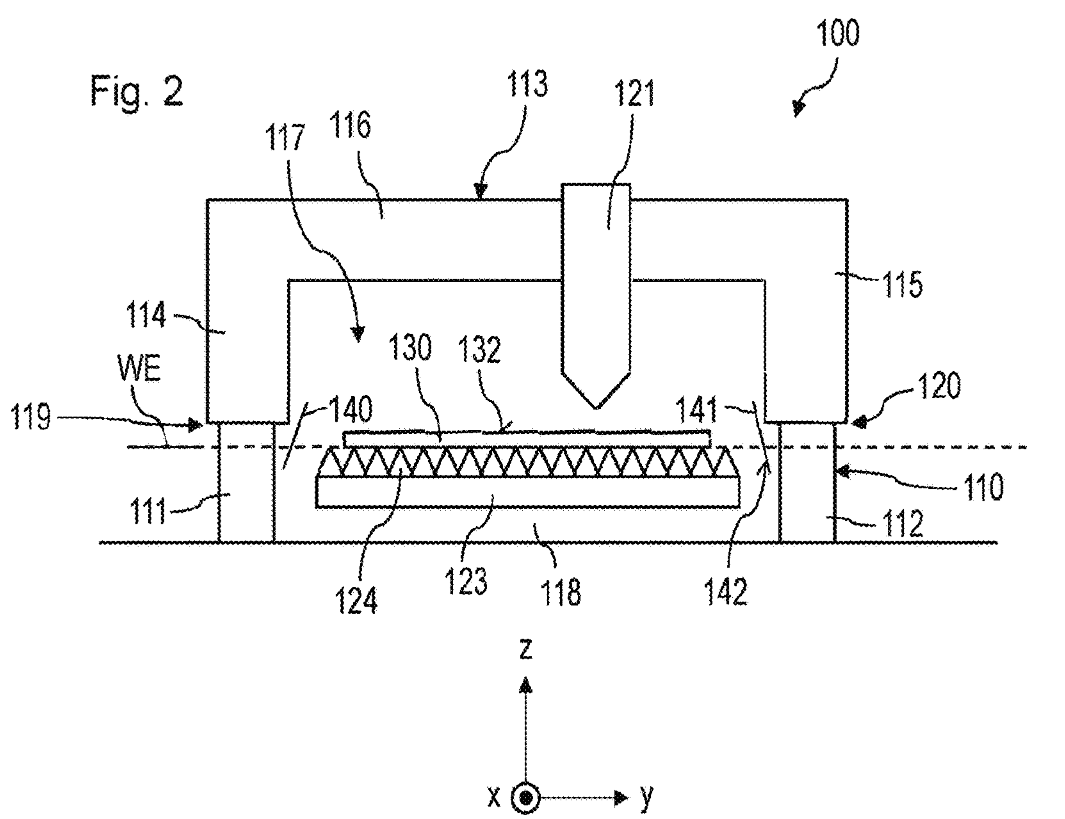
FIG. 2 shows a view of the laser processing machine from FIG. 1 in a plan view from the front.

As can be seen clearly from FIG. 2, the main deflection surface 142 extends in the vertical direction (Z) both upwards (i.e. facing the laser processing head 121) and downwards (i.e. facing away from the laser processing head 121 in the direction of the collection space 118) beyond the workpiece plane WE. This ensures that during the processing operation of various workpieces 130 of different thicknesses, material removed from the workpiece in the form of dirt particles and sparks, which are blown out parallel to the workpiece plane WE in the direction of the transition region 120, are deflected by the spark protection device 141 into the collection space 118 below the workpiece plane WE.

As a result, the processing space 117 and the work surface 132 can be kept clean. The spark protection device 141 also represents a component protection, as the penetration of dirt particles into the mechanical and electrical components in the transition region 120 is at least largely prevented.

FIGS. 3 to 8 each show a section of a right-hand part of the laser processing machine 100 shown in FIG. 2, in which the transition region 120 and various alternative embodiments of the spark protection device 141 are shown. To the right of the laser processing machine 100, a diagram representing the angular relationships is shown in each case to clarify the angular relationship of the different deflection surfaces of the spark protection device 141.

Figure 3:
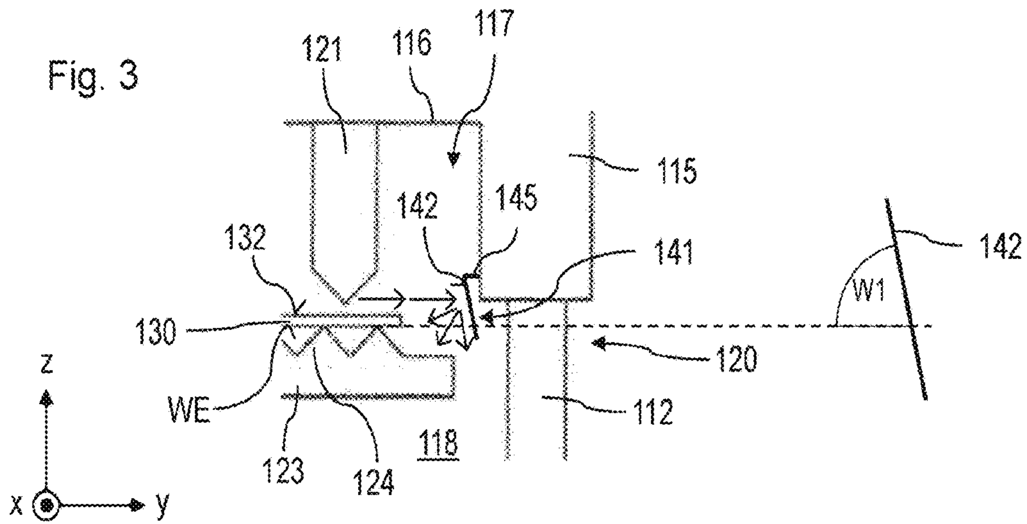
FIGS. 3 to 5 show different alternative embodiments of a spark protection device, each of which is fastened to a bridge of the laser processing machine.
Figure 4:
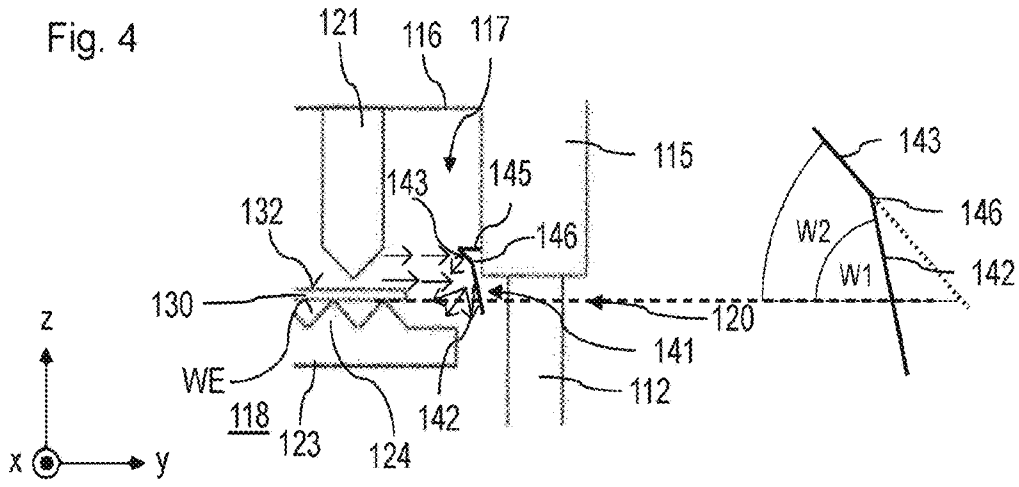
Figure 5:
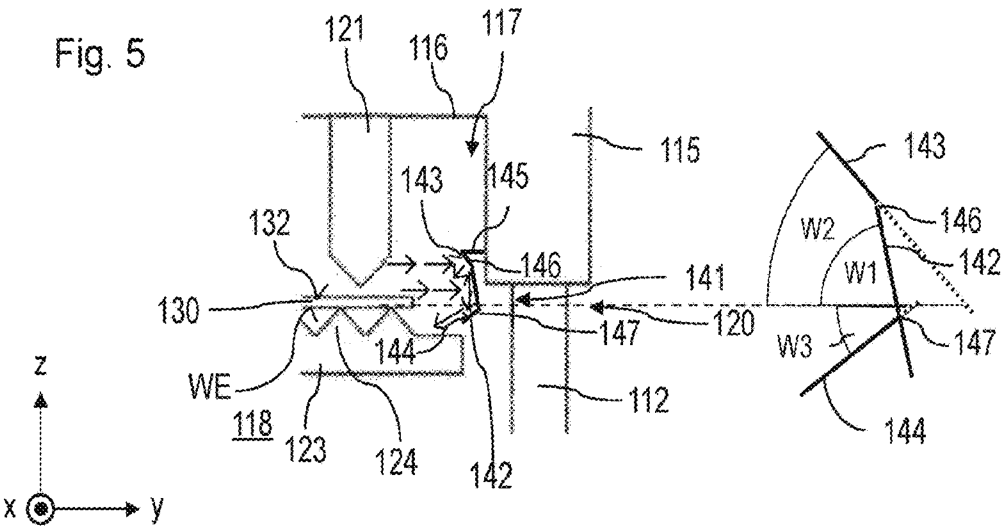

FIGS. 3 to 5 show an alternative embodiment in which the spark protection device 141 is fastened to the bridge foot 115 of the bridge 113 and moves with the bridge 113 when it moves in the longitudinal direction (X). The spark protection device 141 extends in the longitudinal direction (X) across the width of the bridge foot 115.

In contrast, the exemplary embodiments according to FIGS. 6 to 8 each show a variant in which the spark protection device 141 is fastened to the longitudinal member 112. In this alternative embodiment, the spark protection device 141 extends in the longitudinal direction (X) over the entire length of the processing space 117 along the longitudinal beam 112.

FIGS. 3 and 6 each show an exemplary embodiment in which the spark protection device 141 has only the main deflection surface 142 already mentioned. This is inclined at a first angle of inclination W1 in relation to the workpiece plane WE.

FIGS. 4 and 7 show a modified variant in which a first edge 146 of the main deflection surface 142 running in the longitudinal direction (X) is adjoined by a first additional deflection surface 143, which extends with respect to the workpiece plane with a second angle of inclination W2, which is smaller than the first angle of inclination W1, in the direction of the laser processing head 121. By providing the first additional deflection surface 143 above the main deflection surface 142 (i.e. protruding further in the direction of the processing space 117), the efficiency of the spark protection device 141 can be improved by preventing dirt particles from entering a gap between the spark protection device 141 and the region of the transition 120. This applies in particular to the variant according to FIG. 7, in which the gap is open from above. The first edge 146 between the main deflection surface 142 and the first additional deflection surface 143 is expediently formed above the workpiece plane WE, in particular above the upper workpiece surface 132 of the workpiece 130 in the direction of the processing head 121.

In a further modified alternative embodiment, which is shown in FIGS. 5 and 8, a second additional deflection surface 144 is provided in addition to the first additional deflection surface 143. The second additional deflection surface 144, which acts like a slide or a chute, adjoins a second edge 147 of the main deflection surface 142 running in the longitudinal direction (X). In relation to the workpiece plane WE, the second additional deflection surface 144 extends at a third angle of inclination W3 in a direction facing away from the laser processing head 121. The second additional deflection surface 144 ensures that the dirt particles that hit the main deflection surface 142 and/or the first additional deflection surface 143 and are deflected downwards are directed downwards in the direction of the collection space 118 below the workpiece 130.

If the spark protection device 141 is fastened to the longitudinal beam 112, the spark protection device 141 is fastened with the aid of a transition surface 145, which is preferably formed essentially parallel to the workpiece plane WE. Deviating fastening angles are also conceivable. Preferably, the transition surface 145 has one or more recesses (not shown), at least in sections, in order to be able to discharge downwards dirt particles accumulating in the gap between the spark protection device 141 and the transition region comprising the bridge foot 115 and the longitudinal beam 112.

The spark protection device 141 consists of a material with good thermal conductivity, wherein aluminium or steel or alloys thereof are particularly suitable here. Other materials that conduct heat well are also conceivable.

The spark protection device can be formed as a one-piece component. In particular, the spark protection device is then formed as a bent part. If the spark protection device has at least one of the additional deflection surfaces in addition to the main deflection surface, this can also be produced by connecting several individual components.

The scope of protection of the present invention is given by the claims and is not limited by the features illustrated in the description or shown in the figures.

The invention claimed is:

1. A laser processing machine, comprising:

a machine frame comprising two longitudinal beams running in a first direction, and a bridge including a laser processing head running in a second direction transverse to the first direction and two bridge feet extending towards the respective longitudinal beams, the bridge configured and arranged to be movable in the first direction on the two longitudinal beams, wherein a workpiece plane of the laser processing machine for receiving and processing a workpiece is formed in a processing space between the two longitudinal beams, wherein the workpiece plane extends in the first direction and the second direction in a region of a transition from the bridge to the corresponding longitudinal beams, wherein the region of transition is located between a cutting grid and each of the two longitudinal beams, and wherein a spark protection device is arranged in the region of the transition both in between the cutting grid and one of the longitudinal beams, and in between one of the longitudinal beams and the associated bridge foot, the spark protection device comprising a main deflection surface extending in the first direction, and wherein the main deflection surface is inclined transversely to the first direction with respect to the workpiece plane in the direction of the processing space at a first angle of inclination smaller than 90° for deflecting sparks into the processing space in a direction facing away from the laser processing head.

2. The laser processing machine according to claim 1, wherein the main deflection surface extends beyond the workpiece plane in a third direction which extends perpendicularly to the first and second direction.

3. The laser processing machine according to claim 1, wherein the first angle of inclination is between 70° and 88° or between 75° and 87°.

4. The laser processing machine according to claim 1, wherein a first edge of the main deflection surface running in the first direction is adjoined by a first additional deflection surface, which extends with respect to the workpiece plane with a second angle of inclination, which is smaller than the first angle of inclination, in the direction of the laser processing head.

5. The laser processing machine according to claim 4, wherein the first edge is formed between the main deflection surface and the first additional deflection surface above the workpiece plane, in the direction of the laser processing head.

6. The laser processing machine according to claim 1, wherein a second edge of the main deflection surface extending in the first direction is adjoined by a second additional deflection surface that extends with respect to the workpiece plane with a third angle of inclination in a direction facing away from the laser processing head.

7. The laser processing machine according to claim 6, wherein the second edge is formed between the main deflection surface and the second additional deflection surface below the workpiece plane.

8. The laser processing machine according to claim 1, wherein the spark protection device is fastened to the at least one of the two longitudinal beams.

9. The laser processing machine according to claim 8, wherein the spark protection device extends in the first direction over the entire length of the processing space along the at least two longitudinal beams.

10. The laser processing machine according to claim 8, wherein the spark protection device comprises one or more recesses at least in sections in the region of a transition surface extending parallel to the workpiece plane.

11. The laser processing machine according claim 1, wherein the spark protection device is fastened to the bridge and moves with the bridge.

12. The laser processing machine according to claim 1, wherein the spark protection device is made of aluminum or steel or aluminum alloy or steel alloy.

13. The laser processing machine according to claim 1, wherein the spark protection device is formed as a bent part.

* * * * *